UNITED STATES PATENT OFFICE.

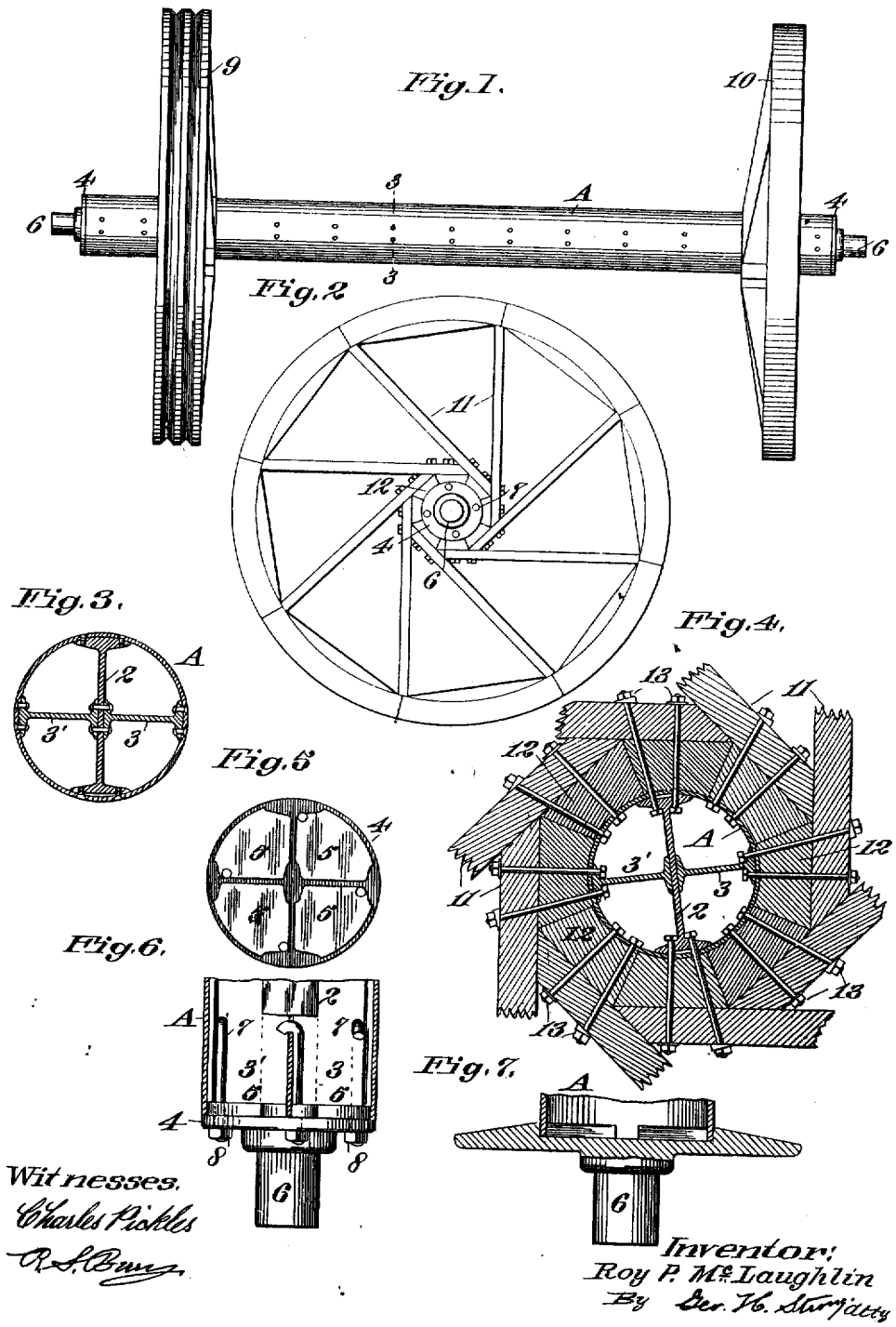

ROY P. McLAUGHLIN, OF SAN FRANCISCO, CALIFORNIA.

WINDING-DRUM.

996,356.

Specification of Letters Patent. Patented June 27, 1911.

Application filed January 11, 1911. Serial No. 601,978.

*To all whom it may concern:*

Be it known that I, ROY P. MCLAUGHLIN, citizen of the United States, residing in the city and county of San Francisco and State of California, have invented new and useful Improvements in Winding-Drums, of which the following is a specification.

This invention relates to a bull wheel and shaft such as is employed in well drilling operations and particularly pertains to the manner of constructing same.

It is the object of this invention to provide a bull wheel and shaft which is possessed of great strength and durability, that is to say, which is capable of withstanding immense strains and considerable usage and not liable to get out of order.

The invention consists of the parts and the combination and construction of parts as hereinafter more fully described and claimed having reference to the accompanying drawings, in which—

Figure 1 is a front elevation of the invention. Fig. 2 is an end view of same. Fig. 3 is a cross section of the shaft on the line 3—3 Fig. 1. Fig. 4 is an enlarged detail showing the wheel construction. Fig. 5 is a detail end elevation of the gudgeon plate. Fig. 6 is a vertical section, partly in elevation, showing the manner of mounting the gudgeon. Fig. 7 is a detail showing the gudgeon plate as extended to form an end flange on the shaft.

In the drawings A represents a cylindrical tubular member, preferably a steel pipe of any suitable diameter, which forms the shaft or axle of this invention. Extending longitudinally through the interior of the pipe A is a diametrically disposed I beam 2, the flanges of which are riveted to the inner arcural surface of the pipe A. Disposed at right angles to the I beam 2 on each side thereof are I beams 3—3', the flanges of which are riveted to the pipe A and to the I beam 2, as shown in Fig. 3. The I beams 2—3—3' extend the full length of the pipe A and terminate flush with the ends thereof. By this construction I obtain a shaft of great strength and which will resist immense torsional strains. This shaft is provided with gudgeons at each end, each of which gudgeons is formed of a circular plate 4 on the inner face of which is formed raised faces 5. These raised portions 5 are adapted to extend into the pipe A between the ends of the I beams 2—3—3', the raised portions conforming to the space between the I beams and the pipe A. A trunnion 6 is formed on the outer face of each gudgeon plate 4 which is adapted to ride in any suitable bearing. The gudgeon plates 4 are held in place on the ends of the pipe A by means of hook bolts 7 which are hooked into perforations in the I beams 2—3—3', and extend through the plate 4 and have nuts 8 threaded on their outer ends, these nuts 8 being screwed on the bolts 7 clamp the gudgeons securely on the pipe A.

Mounted on the tubular shaft A are the usual bull wheels consisting of a tug wheel 9 and a brake wheel 10. The rims of these wheels may be constructed in any suitable manner and are supported on the spokes 11 arranged tangential to the radius of the wheel rims. These spokes 11 are preferably constructed of heavy planking and are mounted at their inner ends on lagging blocks 12 on the pipe A. The lagging blocks 12 may be formed of wood or cast iron and are so formed that their inner faces will conform to the outer curved surface of the pipe A and their outer faces will abut against the inner straight surface of the spokes 11. The spokes 11 and the lagging blocks 12 are secured to the pipe A by means of bolts 13 which extend through the pipe, lagging blocks and spokes, as shown in Fig. 4, and are held in place by means of nuts and washers 13. This manner of attaching the wheels 9—10 to the shaft permits of a fully built wheel being placed thereon as necessary, and also prevents injury of the shaft when the wheels are removed therefrom.

It is manifest that the foregoing manner of constructing a bull wheel and shaft is equally applicable to the construction of a calf-wheel and drum, in the latter instance, however, the gudgeon plates 4 will extend beyond the outer face of the shaft to form end flanges, as shown in Fig. 7.

Having thus described my invention, what I claim and desire to secure by Letters Patent is—

1. In a bull wheel and shaft, a tubular cylindrical pipe, and an I-beam extending longitudinally therethrough and diametrically arranged therein, and other I-beams disposed at right angles to and on each side of said first named I-beam and secured to the latter, and having other flanges abutting directly the central portion of opposite sides of the web of the first named beams, and means for attaching the beams to the pipe.

2. In a bull wheel and shaft, a tubular cylindrical pipe, an I beam extending longitudinally therethrough and diametrically arranged therein, I beams disposed at right angles to and on each side of said first named I beam and secured thereto, said I beams attached to the pipe, and gudgeon plates mounted on the ends of said pipe and secured thereto by means of hook bolts, said bolts engaging said I beams in said pipe.

3. In a bull wheel and shaft, a tubular cylindrical pipe, an I beam extending longitudinally therethrough and diametrically arranged therein, I beams disposed at right angles to and on each side of said first named I beam and secured thereto, said I beams attached to the pipe, and gudgeon plates mounted on the ends of said pipe and secured thereto by means of hook bolts, said bolts engaging said I beams in said pipe, wheels having spokes arranged tangential to their radii, said spokes mounted at their inner ends on lagging blocks, and means for jointly attaching said spokes and blocks to said pipe.

In testimony whereof I have hereunto set my hand in the presence of two subscribing witnesses.

ROY P. McLAUGHLIN.

Witnesses:
CHARLES EDELMAN,
C. C. COOK.

---

Copies of this patent may be obtained for five cents each, by addressing the "Commissioner of Patents, Washington, D. C."